Patented July 25, 1939

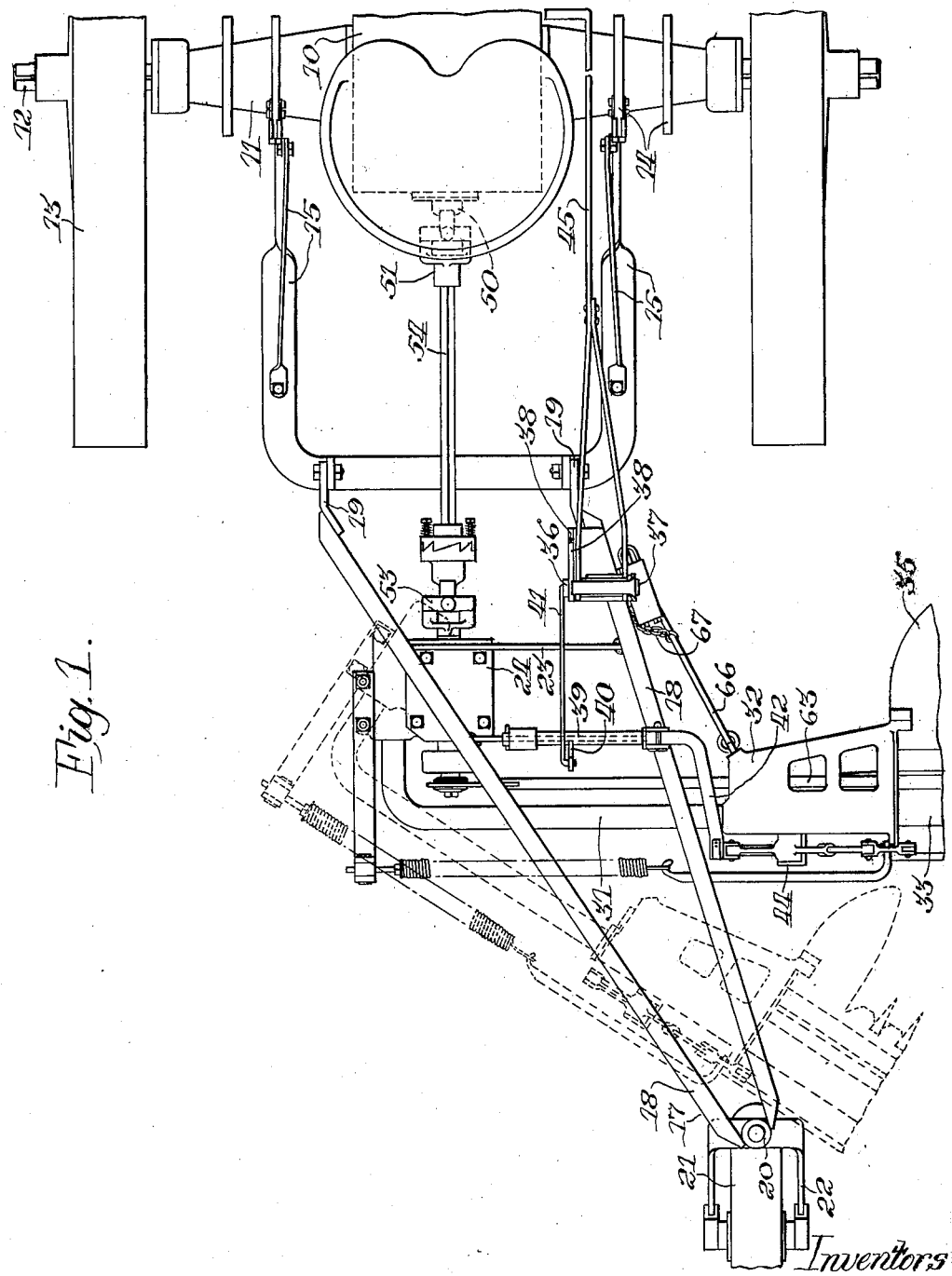

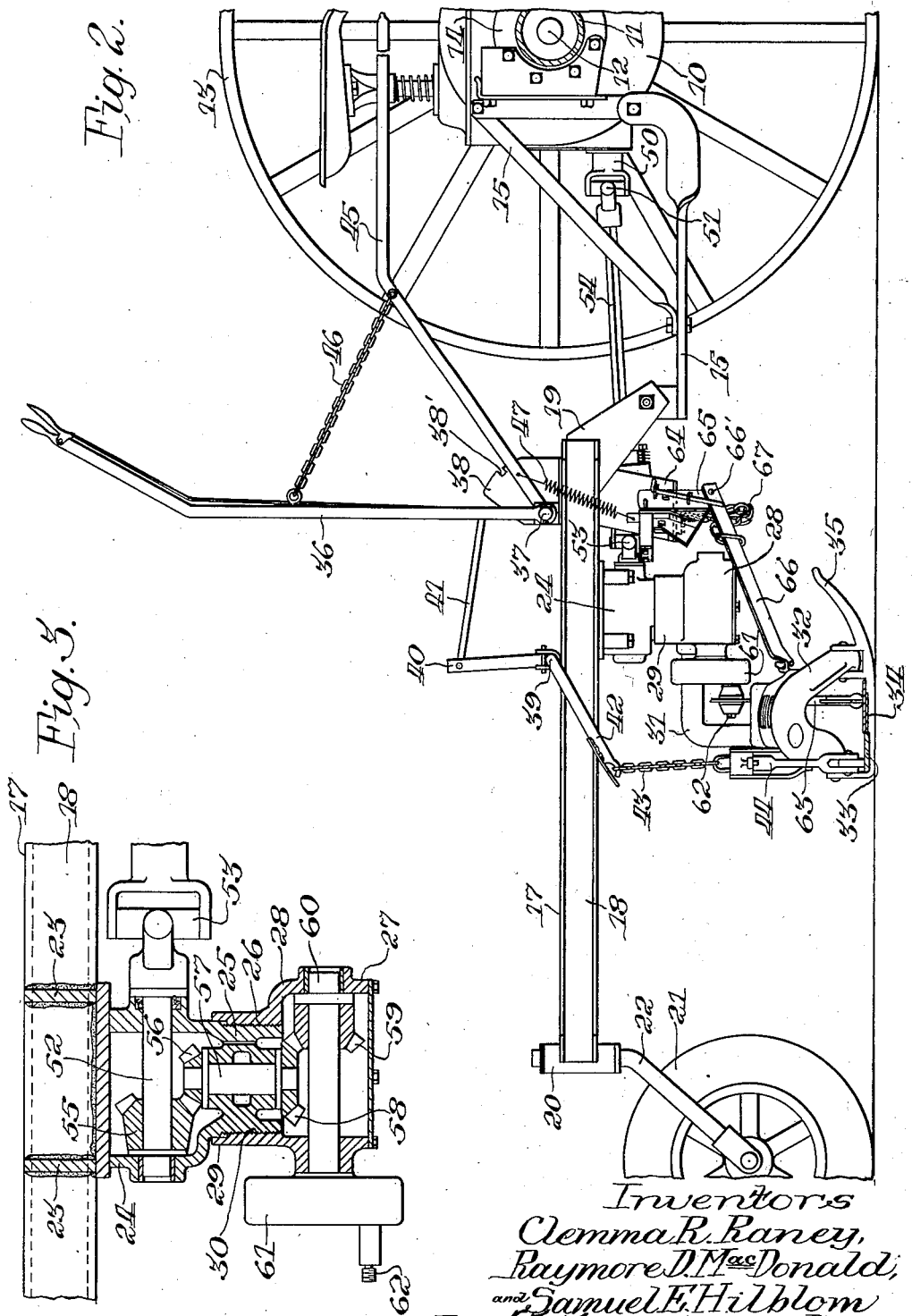

2,166,967

UNITED STATES PATENT OFFICE 2,166,967

TRACTOR MOWER

Clemma R. Raney, Riverside, Raymore D. Mac-Donald, Western Springs, and Samuel E. Hilblom, Chicago, Ill., assignors to International Harvester Company, a corporation of New Jersey Application December 6, 1937, Serial No. 178,214

22 Claims. (Cl. 56—25)

This invention relates to a tractor mower.

Those familiar with the art will understand the problems met in the construction and operation of tractor mounted mowers of the type in which a rearwardly extending frame is supported at its front end on the tractor and at its rear end on a ground engaging means or caster wheel. The mower frame and cutting mechanism are carried below this frame and are mounted for rearward swinging movement about a vertical axis. Inasmuch as this type of mower is particularly adapted for mowing in bordered fields, it is desirable to have the mower mounted also for floating movement with respect to the frame. However, since the mower frame is supported solely on a vertical axis, it becomes necessary to provide an adequate support therefor. It is also desirable to locate the drive mechanism for the mower in close proximity to this vertical axis so that the mower frame may be free to swing rearwardly about said vertical axis when the cutting mechanism strikes an obstruction. Because of the length of the cutter bar, it is important that the mower frame be pivoted on the rearwardly extending frame in such a position as will allow maximum rearward swinging movement of the cutting mechanism without striking or passing under the caster wheel. In the present invention, an ideal adaptation of the relation between the mower frame and the rearwardly extending frame is found in locating the pivot supports fairly well forwardly on the rearwardly extending frame and by combining therewith means for limiting rearward swinging movement of the cutting mechanism to prevent the same from passing beneath or striking the caster wheel.

For its principal object, the invention contemplates the provision of a construction that may be utilized to attain those desired ends mentioned above.

An important object is to provide a support or housing on the rearwardly extending frame and a support or housing on the mower frame, said supports being interconnected to provide a pivot for the mower frame about a vertical axis.

Another important object is to enclose the mower drive mechanism in these housings.

Another object is to correlate the driving mechanism and the housings in a manner permitting free, rearward swinging movement of the mower frame and cutting mechanism without interfering with the component part of the driving mechanism.

Still another object is to connect the driving mechanism and the power take-off shaft of the tractor by telescoping shafting including universal joints, said shafting being disposed in substantially a straight line and with comparatively slight angularity of the universal joints.

Still another object is to provide a drive connection between the driving mechanism and the mower cutting mechanism, said drive connection including a pitman located rearwardly of the supports or housings.

Still another object is to provide supporting means for the driving mechanism that permits rearward swinging movement of the mower cutting mechanism without causing disconnection of the drive connection.

Briefly, these and other objects are achieved in a practicable form of the invention as illustrated by providing a rearwardly extending frame supported at its forward end on a tractor and on its rearward end on a caster wheel. A housing is rigidly carried by the frame, and a mower frame is disposed therebelow, said mower frame including a similar housing. Each of the housings is provided with a vertical sleeve portion, and the mower frame and the rearwardly extending frame are juxtapositioned, with the sleeves interconnected to provide a journal or pivot on a vertical axis to permit rearward swinging movement of the mower frame and cutting mechanism carried thereby. Driving mechanism is carried in and enclosed by the housings, being connected to the power take-off shaft of the tractor and to the cutting mechanism. This driving mechanism includes a vertical shaft co-axial with the aforesaid vertical pivot axis, this provision allowing free rearward swinging movement of the mower frame without interfering with the component parts of the drive mechanism. Stop means are provided for limiting rearward swinging movement of the mower frame to prevent the cutting mechanism from striking or passing beneath the caster wheel.

A further understanding of the objects and desirable features of the invention may be had from the following detailed description taken in conjunction with the accompanying sheets of drawings, in which:

Figure 1 is a plan view showing the mower connected to a tractor;

Figure 2 is a side elevational view of the same; and,

Figure 3 is an enlarged, vertical sectional view taken on the line 3—3 of Figure 1 showing the supporting housings and the mower driving mechanism carried therein and enclosed thereby.

Only a sufficient portion of a tractor has been shown in the drawings as is deemed necessary to serve the purposes of describing and disclosing the invention. The tractor is of the general purpose type comprising a central longitudinally extending body portion 10 having at each side of the rear portion thereof transversely extending axle housings 11. Drive axles 12 extend from these housings and carry at their outer ends traction wheels 13. Each axle housing 11 is provided with a pair of attaching flanges 14. The inner flange on each axle housing is utilized to support a draw-bar 15 of the quick attachable type.

A mower comprising a rearwardly and diagonally extending frame 17, which includes rearwardly converging frame members 18, is supported on the tractor through the medium of the draw-bar 15 and spaced brackets 19 pivotally connected thereto on a transverse axis. The frame 17 forms generally a triangle, having at its apex a journal bracket 20, in which is supported a ground engaging means or a caster wheel 21 carried on a standard or axle 22. It will be apparent from the description thus far, that the frame 17 is carried behind the tractor for floating vertical movement with respect to the tractor as it follows the contour of the ground.

Comparatively close to the forward end of the frame 17, a pair of longitudinally spaced brace members 23 are rigidly secured at opposite ends to the frame members 18. A support or housing 24 is rigidly carried by the frame 17, being secured at the stubbleward side of the frame to a frame member 18 and to the transverse brace members 23. This housing 24 is generally hollow and is provided with a vertically depending sleeve portion 25 which is threaded, as at 26, for a purpose to appear later. A mower frame 27 which includes a support or housing 28 is provided with a vertically upstanding sleeve portion 29, which is threaded as at 30. The mower frame and the rearwardly extending frame 17 are juxtapositioned with the sleeve portions 29 and 25, respectively, disposed in vertical alinement. The two housings 24 and 28 are then interconnected by threading together the threaded portion 30 on the sleeve 29 and the threaded portion 26 on the sleeve 25. In this manner, the mower frame is pivotally carried by the frame 17 on a vertical axis.

A coupling arm 31 is pivotally carried by the mower frame 27 on a longitudinally extending horizontal axis and extends rearwardly therefrom a short distance, being then bent at right angles and extending to the grassward side of the mower, where it rockably carries a yoke 32, of any conventional construction. A cutter bar 33 carries a reciprocating knife 34 in the usual manner, the bar being connected to a ground engaging shoe 35 which is pivotally carried by the yoke 32 on a longitudinally extending horizontal axis. It will be understood, of course, that the shoe 35 is rigidly associated with the cutter bar 33.

A hand lever 36 is carried on a short rock-shaft 37 rotatably carried at the forward end of the frame 17, said lever being adapted to cooperate with a quadrant 38. A second rock-shaft 39 is spaced rearwardly of the rock-shaft 37 and carried by the frame 17, rigidly carrying an upstanding arm 40, which is connected by a link 41 to the hand lever 36. The grass end of the rock-shaft 39 is provided with a rearwardly extending crank arm 42, which is connected by a flexible connection such as a chain 43 with lifting linkage 44, which is in turn connected to the cutter bar 33. The chain 43 is releasably connected to the crank arm 42 for a purpose to be hereinafter disclosed. It will be seen thus far that forward movement of the hand lever 36 will effect raising of the cutter bar 33 for transport or other purposes. A second operating lever 45 is pivotally carried on the rock-shaft 37 and is operatively connected to the lever 36 by a flexible connection in the form of a chain 46. This lever 45 is provided to assist in raising the cutter bar 33. A tension spring 47 is connected to the lever 45 and to a portion of the frame 17 for maintaining the lever 45 in its lower position, as shown, and for maintaining the chain 46 normally taut.

It will be noted that a single notch 38' is provided in the quadrant 38. The purpose of this single notch 38' will become more definitely established as the floatability of the mower frame and the cutter bar is described.

As previously mentioned, the frame 17 is free to move vertically as the traction wheels 13 of the tractor and the caster wheel 21 follow the contour of the ground. Similarly, by virtue of the pivotal connection between the yoke 31 and the mower frame 27, the mower frame and cutting mechanism are permitted to move upwardly and downwardly with respect to the frame 17, as the shoe 35 follows the contour of the ground; and especially in operating the mower over bordered fields, the ground contour is extraordinarily uneven, and at times there are abrupt changes therein. Inasmuch as the frame 17 and the mower parts are free to float with respect to each other, there must be unlimited freedom of movement somewhere in the connections in the lift mechanism. This freedom is provided by forming the quadrant 38 with a continuous edge interrupted only by the single notch 38'. Thus, in an extreme raised position of the mower, as the shoe 35 rides over an extraordinarily high spot in the ground, the lever 36 is free to move a substantial distance about the quadrant 38 without engaging the notch 38'. However, when it is necessary to lift the cutter bar 33 for transport or other purposes, the single notch 38' is engaged by any conventional form of detent mechanism on the lever 36 to hold the cutter bar 33 in raised position.

The drive mechanism for the mower cutting mechanism will now be described.

The tractor is provided with a conventional type of power take-off shaft 50 provided with a universal joint 51. In a preferred embodiment, as shown and described herein, the housing 24 encloses and rotatably carries a longitudinally extending drive shaft 52. This shaft extends forwardly from the housing 24 and, through the medium of a universal joint 53 and telescoping shafting 54, is operatively connected to the universal joint 51 and the power take-off shaft 50 of the tractor. As previously mentioned, the supports or housings 24 and 28 are substantially hollow, and in this manner they are adapted to contain and enclose drive gearing for the mower cutting mechanism. The shaft 52 carries for rotation therewith, within the housing 24, a bevel gear 55, which meshes with a bevel gear 56 carried for rotation on a vertically disposed shaft 57. This shaft 57 is rotatably carried by the sleeve portion 25 of the housing 24 and is coaxial with the aforesaid vertical axis formed by the interconnection of the two housings. At its lower end, the shaft 57 carries for rotation therewith a bevel gear 58, which meshes with and drives a bevel gear 59 carried on and for rotation with a longitudinally extending shaft 60 journaled in the housing 28.

The shaft 60 extends rearwardly of the housing 28 and carries for rotation therewith a flywheel 61, which provides a crank pin 62. In order to provide a drive connection between the fly-wheel and the cutting mechanism, a pitman 63 is operatively connected at one end to the crank pin 62 at the other end of the cutting knife 34. As will be apparent from the description and the drawings, this pitman is located rearwardly of the fly-wheel 61, and, consequently, rearwardly of the support or housings 24 or 28. In this manner, the pitman is afforded protection against possible damage by obstructions which may be encountered in the operation of the mower.

An important feature of the invention, as provided by the ideal construction herein disclosed and described, is the disposition of the vertical shaft 57 coaxial with the vertical pivot axis between the mower frame 27 and the rearwardly extending frame 17. The importance of this feature will be apparent from the following description of the particular advantages obtainable from the relation between the aforesaid pivot axis and the releasability of the mower frame and cutting mechanism.

The rearwardly extending frame 17 rigidly carries a downwardly extending plate portion 64 which in turn carries a release coupling mechanism 65. It will be understood that this release mechanism may be of any suitable construction. A release bar 66 is pivotally connected at one end to the yoke 32 and is releasably connected at its other end to the release mechanism 65. This release mechanism is of more or less general construction and is provided for the purpose of permitting rearward swinging movement of the mower frame and cutting mechanism when the cutting mechanism strikes an obstruction, as is well understood by those skilled in the art. In the present invention, stop means. such as the chain 67, is provided for limiting the rearward swinging movement in order to prevent the cutter bar 33 from striking or passing beneath the caster wheel 21. It is obvious, of course, that this chain 67, or other suitable means, may be connected to the component parts of the mower in any manner to serve as means toward the same end. For the sake of disclosure in the present invention, the chain is connected at one end to the depending plate portion 64 and at the other end is provided with a comparatively large elongated link, which is fitted over the release bar 66. At its point of releasable connection with the release mechanism 65, the release bar 66 is provided with a projecting pin 66', which provides an abutment or stop means for the elongated link when the mower frame is released from its normally operative position.

As previously described, the construction and relationship of the component parts of the mower are such as to permit free floating movement of the frame 17 with respect to the tractor and also to permit free floating movement of the mower frame and cutting mechanism with respect to the frame 17. The particular positioning of the shafting 54 between the power take-off shaft 50 of the tractor and the drive shaft 52 of the mower drive mechanism readily adapts itself to these free floating movements. As is well understood by those skilled in the art, as the mower is operated over a field, certain obstructions are encountered by the cutting mechanism. In such instances, the release bar 66 is released from the release mechanism 65 and the mower frame swings rearwardly about the vertical axis provided by the journal or pivot mounting between the housings 24 on the frame 17 and the housing 28 on the mower frame 27.

As the mower frame, with the cutting mechanism, swings rearwardly, the chain 43 is released from the crank arm 42 by virtue of the releasable connection previously mentioned. Also, as the mower frame swings rearwardly, the chain 67 slides forwardly along the release bar 66 until the elongated link thereon is stopped by the abutment 66'. This chain 67 is of a predetermined length and is so connected to the relatively movable parts of the mower as to permit rearward swinging movement of the mower frame and cutting mechanism only to such a point whereat the cutter bar 33 does not pass rearwardly beyond the point of tangency between the caster wheel 21 and the ground. This position is generally indicated by dotted lines in Figure 1. It will be understood, of course, that the telescoping shafting 54 is not necessarily releasable because of the desirable location of the shaft 57 on the aforesaid vertical axis. Because of the provision of the stop means or chain 67, there is no danger of engagement between the caster wheel 21 and the cutter bar 33, which eliminates the possibility of damage to either. To restore the mower frame and cutting mechanism to operative position, it is necessary merely to back the tractor until the cutter bar 33 is once again in transverse position. Then, the release bar 66 is again connected to the release mechanism 65, and the chain 43 is again connected to the crank arm 42. The shafting 54, of course, has remained connected and is always in driving relation; the mower is then ready for normal operation.

As previously mentioned, the location of the shaft 57 assumes a position of great importance, inasmuch as it enables the drive mechanism to permit rear swinging movement of the cutting mechanism about the vertical axis of the housings 24 and 28 without undue twisting of the shafting and gearing of the drive mechanism.

It will be noted that the threaded portions 26 and 30 of the housings 24 and 28, respectively, provide a simple journal connection between the mower frame and the frame 17. It will be understood, of course, that any other journal or pivot means may be utilized in place of the threaded portions without, however, sacrificing any of the advantages obtainable from the construction shown and described. It will also be understood that numerous other alterations and modifications may be made in other parts of the construction without departing from the spirit and scope of the invention, as defined in the appended claims.

What is claimed is:

1. In combination with a tractor having a power take-off shaft, a mower comprising a frame supported on the tractor for vertical movement with respect thereto, a housing carried by the frame, a mower frame carried by said housing for movement about a vertical axis, cutting mechanism on the mower frame, and drive mechanism carried by the housing and operatively connected to the power take-off shaft and to the cutting mechanism.

2. In combination with a tractor, a non-releasable frame connected to the tractor for movement about a transverse axis, a releasable mower frame connected to the first frame for movement about a vertical axis, cutting mechanism associated with the mower frame, release means normally holding the mower frame in operative position, said means being releasable to permit rearward swinging movement of the mower frame about said vertical axis when the cutting mechanism strikes an obstruction, and stop means to limit said swinging movement.

3. In combination with a tractor having a power take-off shaft, a frame connected to the tractor for movement about a transverse axis, a housing carried by the frame rearwardly of said axis, a mower frame including a housing movably associated with the first housing for interconnecting the frames for relative movement about a vertical axis, cutting mechanism associated with the mower frame, and drive gearing carried and enclosed by one of the housings, said drive gearing being operatively connected to the power take-off shaft and to the cutting mechanism.

4. In combination with a tractor having a power take-off shaft, a non-releasable frame connected to the tractor for movement about a transverse axis, a releasable frame movably connected to the first frame on a vertical axis rearwardly of the transverse axis, cutting mechanism associated with the releasable frame, and driving connections between the power take-off shaft and the cutting mechanism, said driving connections including a transverse pitman disposed rearwardly of the aforesaid vertical axis.

5. In combination with a tractor having a power take-off shaft, a mower comprising a non-releasable frame supported on the tractor for movement about a transverse axis, a support associated with said frame rearwardly of said axis, a releasable mower frame associated with said housing, said housing serving to interconnect the said two frames for relative movement about a vertical axis, cutting mechanism on the mower frame, and driving connections between the power take-off shaft and the cutting mechanism, said connections having a portion thereof carried by the support and including a transverse pitman located rearwardly of the support.

6. In combination with a tractor, a non-releasable frame movably connected to the tractor on a transverse axis, and a releasable mower frame connected to said frame for relative movement about a vertical axis disposed rearwardly of the transverse axis.

7. In combination with a tractor, a frame carried on the tractor for vertical movement with respect thereto about a transverse axis, a mower frame releasably connected to the first frame and mounted thereon for rearward swinging movement about a vertical axis when released, cutting mechanism including a cutter-bar movably associated with the mower frame, and lifting mechanism carried by the first frame and operatively connected to the cutter-bar for lifting same to raised position.

8. In combination with a tractor having a power take-off shaft, a mower comprising a frame structure including a pair of rearwardly extending frame members connected at their forward ends to the tractor, a caster wheel supporting the rearward ends, a brace interconnecting the frame members, a support carried by the brace, a mower frame pivotally carried by the support on a vertical axis, mower drive mechanism driven by the power take-off shaft and including a driving shaft coaxial with the vertical axis and a second driving shaft driven by the first driving shaft, cutting mechanism carried by the mower frame, a pitman disposed rearwardly of the support and operatively connected to the cutting mechanism and driven by the second shaft, releasable latch means normally holding the cutting mechanism in operative position, said means being releasable when the cutting mechanism strikes an obstruction to permit the mower frame to swing rearwardly about the aforesaid vertical axis, and stop means for limiting said rearward movement to a point forwardly of the point of tangency between the caster wheel and the ground.

9. In combination with a tractor having a power take-off shaft, a mower comprising a rearwardly extending frame structure connected at its forward end to the tractor, a caster wheel supporting the rearward end of the frame structure, a housing carried by the frame structure, a mower frame pivotally carried by the housing on a vertical axis, mower drive mechanism associated with the housing and driven by the power take-off shaft and including a driving shaft coaxial with the vertical axis and a second driving shaft driven by the first driving shaft, cutting mechanism carried by the mower frame, a pitman operatively connected to the cutting mechanism and driven by the second shaft, releasable latch means normally holding the cutting mechanism in operative position, said means being releasable when the cutting mechanism strikes an obstruction to permit the mower frame to swing rearwardly about the aforesaid vertical axis, and means for limiting said rearward movement to a point forwardly of the point of tangency between the caster wheel and the ground.

10. In combination with a tractor having a power take-off shaft, a mower comprising a rearwardly extending frame pivotally connected at its forward end to the tractor, ground engaging means supporting the rearward end of the frame, a support carried by the frame, a mower frame including a second support journaled on the first support on a vertical axis, cutting mechanism associated with the mower frame, a drive shaft journaled in the first support, a flexible drive connection between said shaft and the power take-off shaft, a second drive shaft journaled in the second support, a drive connection between said second shaft and the cutting mechanism, and drive means between the first and second drive shafts.

11. In combination with a tractor having a power take-off shaft, a mower comprising a rearwardly extending frame pivotally connected at its forward end to the tractor, ground engaging means supporting the rearward end of the frame, a support carried by the frame, a mower frame including a second support journaled on the first support on a vertical axis, cutting mechanism associated with the mower frame, a drive shaft journaled in the first support and connected to the power take-off shaft, a second drive shaft journaled in the second support parallel with the first drive shaft, a vertical shaft carried by one of the supports between the aforesaid drive shafts and coaxial with the aforesaid vertical axis, drive means interconnecting said three shafts, cutting mechanism associated with the mower frame, and a drive connection between said cutting mechanism and the aforesaid second drive shaft.

12. In combination with a tractor having a power take-off shaft, a mower comprising a rearwardly extending frame pivotally connected at its forward end to the tractor, ground engaging means supporting the rearward end of the frame, a support carried by the frame, a vertical journal portion on said support, a mower frame including a support having a vertical journal portion, said first and second supports being juxtapositioned with their respective journal portions coaxial to form a pivot for the mower frame on a vertical axis, cutting mechanism associated with the mower frame, a releasable latch means for normally holding the cutting mechanism and mower frame in operative position, said latch means being releasable when the cutting mechanism strikes an obstruction to permit rearward swinging movement of the mower frame about the aforesaid vertical axis, and drive mechanism carried by one of the supports and operatively connected to the power take-off shaft and to the cutting mechanism, said drive mechanism including a vertical shaft carried by one of the supports coaxial with the aforesaid vertical axis.

13. In combination with a tractor having a power take-off shaft, a mower comprising a rearwardly extending frame pivotally connected at its forward end to the tractor, ground engaging means supporting the rearward end of the frame, a support carried by the frame, a depending threaded sleeve on the support, a mower frame, a support on the mower frame, an upstanding, threaded sleeve on said support, said supports being juxtapositioned with said sleeves disposed coaxially and interconnected to form a pivot for the mower frame on a vertical axis, cutting mechanism carried by the mower frame, releasable latch means for normally holding the mower frame and cutting mechanism in operative position, said means being releasable when the cutting mechanism strikes an obstruction to permit rearward swinging movement of the mower frame about the aforesaid vertical axis, and drive mechanism operatively connected to the power take-off shaft and to the cutting mechanism, said drive mechanism including a vertical shaft carried by one of the supports coaxial with the aforesaid vertical axis.

14. In combination with a tractor having a power take-off shaft, a mower comprising a rearwardly extending frame pivotally connected at its forward end to the tractor, ground engaging means supporting the rearward end of the frame, a support carried by the frame, a depending, threaded sleeve on the support, a mower frame, a support on the mower frame, an upstanding, threaded sleeve on said support, said supports being juxtapositioned with said sleeves disposed coaxially and interconnected to form a pivot for the mower frame on a vertical axis, cutting mechanism carried by the mower frame, drive mechanism operatively connected to the power take-off shaft and to the cutting mechanism, and stop means for limiting said rearward movement to prevent the cutting mechanism from passing between the ground and the aforesaid ground engaging means.

15. In combination with a tractor having a power take-off shaft, a mower comprising a rearwardly extending frame pivotally connected at its forward end to the tractor, ground engaging means supporting the rearward end of the frame, a depending threaded member associated with the frame, a mower frame, an upstanding threaded member on the mower frame, said first frame and the mower frame being juxtapositioned with the threaded members disposed coaxially and interconnected to form a pivot for the mower frame on a vertical axis, cutting mechanism carried by the mower frame and operatively connected to the power take-off shaft, and a releasable latch means for normally holding the cutting mechanism and the mower frame in operative position, said means being releasable when the cutting mechanism strikes an obstruction to permit rearward swinging movement of the mower frame about the aforesaid vertical axis.

16. In combination with a tractor having a power take-off shaft, a mower comprising a rearwardly extending frame pivotally connected at its forward end to the tractor, ground engaging means supporting the rearward end of the frame, a depending threaded member associated with the frame, a mower frame, an upstanding threaded member on the mower frame, said first frame and the mower frame being juxtapositioned with the threaded members disposed coaxially and interconnected to form a pivot for the mower frame on a vertical axis, cutting mechanism carried by the mower frame and operatively connected to the power take-off shaft, a releasable latch means for normally holding the cutting mechanism and the mower frame in operative position, said means being releasable when the cutting mechanism strikes an obstruction to permit rearward swinging movement of the mower frame about the aforesaid vertical axis, and means for limiting said rearward movement to prevent the cutting mechanism from passing beneath the ground engaging means.

17. In combination with a tractor having a power take-off shaft, a mower comprising a rearwardly extending frame pivotally connected at its forward end to the tractor, ground engaging means supporting the rearward end of the frame, a depending threaded member associated with the frame, a mower frame, an upstanding threaded member on the mower frame, said first frame and the mower frame being juxtapositioned with the threaded members disposed coaxially and interconnected to form a pivot for the mower frame on a vertical axis, cutting mechanism carried by the mower frame, a releasable latch means for normally holding the cutting mechanism and the mower frame in operative position, said means being releasable when the cutting mechanism strikes an obstruction to permit rearward swinging movement of the mower frame about the aforesaid vertical axis, and drive mechanism operatively connected to the power take-off shaft and to the cutting mechanism, said drive mechanism including a vertical shaft journaled in one of the aforesaid threaded members and coaxial with the aforesaid vertical axis.

18. In combination with a tractor having a power take-off shaft, a mower comprising a rearwardly extending frame pivotally connected at its forward end to the tractor, ground engaging means supporting the rearward end of the frame, a mower frame including a member journaled on the first frame on a vertical axis, cutting mechanism associated with the mower frame, a drive shaft associated with the first frame, a flexible drive connection between said shaft and the power take-off shaft, a second drive shaft associated with the mower frame, a drive connection between said second shaft and the cutting mechanism, and drive means between the first and second drive shafts including a shaft coaxial with the aforesaid vertical axis.

19. In combination with a tractor having a power take-off shaft, a mower comprising a rearwardly extending frame pivotally connected at its forward end to the tractor, ground engaging means supporting the rearward end of the frame, a mower frame including a member journaled on the first frame on a vertical axis, cutting mechanism associated with the mower frame, a drive shaft associated with the first frame substantially coaxial with and connected to the power take-off shaft, a second drive shaft associated with the mower frame and parallel with the first drive shaft, a vertical shaft carried by the aforesaid member between the aforesaid drive shafts and coaxial with the aforesaid vertical axis, drive means interconnecting said three shafts, cutting mechanism associated with the mower frame, and a drive connection between said cutting mechanism and the aforesaid second drive shaft.

20. In combination with a tractor having a power take-off shaft, a mower comprising a frame structure supported at its forward end on the tractor, ground engaging means supporting the rearward end of the frame, a mower frame including a support carried by the first frame, cutting mechanism carried by the mower frame, and drive mechanism associated with the mower frame and driven by the power take-off shaft of the tractor, said drive mechanism including a driving connection to the cutting mechanism, said driving connection being located rearwardly of the support.

21. In combination with a tractor having a power take-off shaft, a mower comprising a frame structure supported at its forward end on the tractor, ground engaging means supporting the rearward end of the frame, a housing carried by said frame, a mower frame including a housing supported on the first housing, cutting mechanism carried by the mower, drive mechanism carried and enclosed by said housing, a flexible drive connection between the drive mechanism and the tractor power take-off shaft, and a pitman operatively connecting the cutting mechanism and the drive mechanism, said pitman being located rearwardly of the aforesaid housings.

22. In combination with a tractor having a power take-off shaft, a mower comprising a frame structure supported at its forward end on the tractor, ground engaging means supporting the rearward end of the frame, a housing rigidly carried by said frame, a mower frame including a housing pivotally supported on the first housing for movement about a vertical axis, cutting mechanism carried by the mower frame, said mower frame and cutting mechanism being rearwardly swingable about the vertical axis when the cutter-bar strikes an obstruction, a set of drive gearing carried by and enclosed in the first housing and connected to the power take-off shaft of the tractor, a set of drive gearing carried by and enclosed in the second housing, drive means carried by and enclosed in the housings between the two sets of drive gearing for permitting swinging movement of the second housing with respect to the first housing, and a pitman operatively connecting the cutting mechanism and the second set of drive gearing, said pitman being located rearwardly of the housings.

CLEMMA R. RANEY.
RAYMORE D. MacDONALD.
SAMUEL E. HILBLOM.

DISCLAIMER 2,166,967.—*Clemma R. Raney*, Riverside, *Raymore D. MacDonald*, Western Springs, and *Samuel E. Hilblom*, Chicago, Ill. TRACTOR MOWER. Patent dated July 25, 1939. Disclaimer filed March 20, 1941, by the assignee, *International Harvester Company*.

Hereby disclaims the combination claimed in claim 1 except wherein the mower frame is carried by said housing for movement about a vertical axis with respect to the first named frame; and disclaims claim 20 in its entirety.

[*Official Gazette April 15, 1941.*]